United States Patent
Dundas (10) Patent No.: US 11,392,382 B2
(45) Date of Patent: Jul. 19, 2022

(54) USING A GRAPH BASED MICRO-BTB AND INVERTED BASIC BLOCK QUEUE TO EFFICIENTLY IDENTIFY PROGRAM KERNELS THAT WILL FIT IN A MICRO-OP CACHE

(71) Applicant: Samsung Electronics Co., Ltd., Suwon-si (KR)

(72) Inventor: James David Dundas, Austin, TX (US)

(73) Assignee: SAMSUNG ELECTRONICS CO., LTD.

(*) Notice: Subject to any disclaimer, the term of this patent is extended or adjusted under 35 U.S.C. 154(b) by 258 days.

(21) Appl. No.: 16/578,257

(22) Filed: Sep. 20, 2019

(65) Prior Publication Data
US 2020/0371944 A1    Nov. 26, 2020

Related U.S. Application Data

(60) Provisional application No. 62/851,090, filed on May 21, 2019.

(51) Int. Cl.
*G06F 9/38* (2018.01)

(52) U.S. Cl.
CPC .......... *G06F 9/3802* (2013.01); *G06F 9/3804* (2013.01); *G06F 9/3806* (2013.01); *G06F 9/3808* (2013.01); *G06F 9/3844* (2013.01)

(58) Field of Classification Search
CPC ..... G06F 9/26; G06F 9/28; G06F 9/22; G06F 9/223; G06F 9/226; G06F 9/24; G06F 9/261; G06F 9/262; G06F 9/264; G06F 9/265; G06F 9/267; G06F 9/268; G06F 9/3808
See application file for complete search history.

(56) References Cited

U.S. PATENT DOCUMENTS

| 10,402,200 B2* | 9/2019 | Dundas | G06F 9/3806 |
| 2003/0009620 A1* | 1/2003 | Solomon | G06F 1/3243 |
| | | | 711/118 |
| 2009/0249036 A1* | 10/2009 | Rappoport | G06F 1/3203 |
| | | | 712/220 |

(Continued)

FOREIGN PATENT DOCUMENTS

WO    2018142140 A1    8/2018

OTHER PUBLICATIONS

B. Grayson et al., "Evolution of the Samsung Exynos CPU Microarchitecture," 2020 ACM/IEEE 47th Annual International Symposium on Computer Architecture (ISCA), 2020, pp. 40-51 (Year: 2020).*

*Primary Examiner* — Keith E Vicary
(74) *Attorney, Agent, or Firm* — Renaissance IP Law Group LLP (57) ABSTRACT

Micro-operations (μops) are allocated into a μop cache by dividing, by a micro branch target buffer (μBTB), instructions into a first basic block in which the instructions are executed by a processing device and the first basic block corresponds to an edge of the instructions being executed by the processing device. The μBTB allocates the first basic block to an inverted basic block queue (IBBQ) and the IBBQ determines that the first basic block fits into the μop cache. The IBBQ allocates the first basic block to the μop cache based on a number of times the edge of the instructions corresponding to the first basic block is repeatedly executed by the processing device.

20 Claims, 4 Drawing Sheets

(56) References Cited

U.S. PATENT DOCUMENTS

| | | |
|---|---|---|
| 2017/0068539 A1* | 3/2017 | Dundas ................. G06F 9/3806 |
| 2018/0088956 A1 | 3/2018 | Combs |
| 2018/0246718 A1* | 8/2018 | Lin ....................... G06F 9/3804 |
| 2019/0188142 A1* | 6/2019 | Rappoport ............ G06F 9/3017 |
| 2019/0235873 A1* | 8/2019 | Dundas ............... G06F 12/0875 |
| 2020/0210190 A1* | 7/2020 | Hensley .............. G06F 9/30058 |
| 2020/0285466 A1* | 9/2020 | Kotra ................... G06F 9/3818 |

* cited by examiner

USING A GRAPH BASED MICRO-BTB AND INVERTED BASIC BLOCK QUEUE TO EFFICIENTLY IDENTIFY PROGRAM KERNELS THAT WILL FIT IN A MICRO-OP CACHE

CROSS-REFERENCE TO RELATED APPLICATION

This application claims the priority benefit under 35 U.S.C. § 119(e) of U.S. Provisional Application No. 62/851,090 filed on May 21, 2019, the disclosure of which is incorporated herein by reference in its entirety.

TECHNICAL FIELD

The subject matter disclosed herein relates to an instruction cache in a processing device. More specifically, the subject matter disclosed herein relates to a system and method to efficiently allocate micro-operations (μops) to a μop cache in a processing device.

BACKGROUND

Central processing units (CPUs) in mobile devices are constrained by power consumption based on the battery life of the mobile device and by performance throttling related to thermal limitations. Accordingly, reductions in power consumption without performance penalties may provide desirable advancements of CPU micro-architecture. A trace cache has been developed that provides that repeated instruction streams do not need to repeatedly pass through an entire instruction and decode pipeline. Instead decoded μops for the repeated instructions are fetched from a cache structure. The trace cache provides an ability to compress post-decoded instructions after a variable length x86 instruction set architecture (ISA) decoder or micro-code read-only memory (ROM) readout, as well as to avoid misaligned cache line fetches. Trace caches may use dedicated trace cache zero-bubble biased based branch predictors and follow the literal "trace" of the code making redundant copies of same instructions should branches of the instructions take the trace down different paths.

A μop cache has also been developed. Micro-operations in a μop cache are matched to corresponding input instructions on an exact address mapping, resulting in a tradeoff that uses less storage than a trace cache due to lack of μop replication. Micro-operation encoding, however, generally uses more bits than do instructions in an instruction cache, therefore, a μop cache may typically use more storage than an instruction cache. A μop cache allows a CPU having a variable length decode and/or a ROM restriction to have some improved performance by decoupling a fetch bottleneck from the dispatch. Additionally, a μop cache may provide some power savings by not redundantly sequencing through the instruction/decode pipelines if a basic block is present in the μop cache. While more compressed than for a trace cache because trace caches replicate μops and μop caches do not, the μop structures have been successful and are active in many CPUs today.

In Advanced RISC Machine (ARM) ISAs, implementations in A64 do not have variable-length decoding or typically use a ROM for microcode routines. Thus, decoupling a fetch-and-issue operation via μop cache may provide little performance benefit. Nevertheless, ARM implementations tend to be targeted at mobile applications, so reducing power may be desirable, especially as performance targets of mobile devices continue to increase.

Micro-op caches that focus only on power and do not act as a mid-pipe cache to decouple decoded instructions from various fetch mechanisms may allow optimization based on different design constraints. Specifically, choices on a driving predictor, an ability to match instructions, what and when to write, and when to read from the cache for power may allow for a new design space.

SUMMARY

An example embodiment provides a method to allocate micro-operations (μops) into a μop cache that may include: dividing, by a micro branch target buffer (μBTB), instructions into a first basic block, the instructions being executed by a processing device and the first basic block corresponding to an edge of the instructions being executed by the processing device; allocating, by the μBTB, the first basic block to an inverted basic block queue (IBBQ); allocating, by the μBTB, the first basic block to an inverted basic block queue (IBBQ) in response to the first basic block being determined to fit into the μop cache; and allocating, by the IBBQ, the first basic block to the μop cache based on a number of times the edge of the instructions corresponding to the first basic block is repeatedly executed by the processing device. In one embodiment, the method may further include incrementing a counter in the μBTB containing a count of the number of times that the edge corresponding to the first basic block is executed by the processing device. In another embodiment, the IBBQ may include an N-entry buffer to track a number of times basic blocks allocated to the IBBQ are repeated.

An example embodiment provides a processing device that may include a micro-operation (μop) cache, a micro branch target buffer (μBTB) and an inverted basic block queue (IBBQ). The μBTB may divide instructions into a first basic block in which the instructions may be executed by the processing device and the first basic block corresponding to an edge of the instructions being executed by the processing device and in which the μBTB may determine that the first basic block fits into the μop cache. The IBBQ may be coupled to the μBTB, and the IBBQ may receive the first basic block based on the first basic block being determined to fit into the μop cache. The IBBQ may allocate the first basic block to the μop cache based on a number of times the edge of the instructions corresponding to the first basic block is repeatedly executed by the processing device. In one embodiment, the μBTB may further include a counter containing a count of the number of times that the edge corresponding to the first basic block is executed by the processing device.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

Micro-op caches are relatively small and for efficiency reasons have a cache line size that is generally much smaller than that of an associated instruction cache. Typical μop cache lines are frequently not fully occupied with valid decoded instructions due to branching behavior of the instructions, thereby resulting in an inefficient use of the μop cache. If, for example, a CPU is too aggressive in trying to fit decoded instructions into a typical μop cache, previously decoded instructions that have been evicted (i.e., removed) from the μop cache may be subsequently needed by a program kernel, resulting in μop cache misses that waste power, and in some implementations may cause a performance loss due to fetch accessing the instruction cache.

The subject matter disclosed herein provides a μop cache system that efficiently fills lines of a μop cache with groups of basic blocks (μops) of a program kernel that (1) are most likely to be fetched and (2) collectively fit into the μop cache. As used herein, the term "basic block" means a "straight line" segment of instructions (μops) that begins at either a target of a taken branch or at the next sequential instruction of a non-taken branch, and ends at the next branch in program order, inclusive. A micro branch target buffer (μBTB) may be modified by adding weights that track the "heat" of each of the program edges/basic blocks represented by the taken, not-taken and sequential links in the μBTB graph entries. An inverted basic block queue (IBBQ) determines which hot blocks should fit into the μop cache. The hotness of each basic block is tracked, and a group of the hottest basic blocks is determined, or estimated, that individually fit into the μop cache and that collectively fit into the μop cache.

Thermometer weights may be used by the μBTB to keep track of the "hotness" of each basic block. Each time that a basic block of instructions is committed, a corresponding thermometer weight in the μBTB is incremented. If any particular weight saturates, all weights are divided by 2 by shifting the weight value to the right by one bit, thereby allowing the relative heats of all of the basic blocks to be maintained. An inverted basic block queue (IBBQ) may be used to sort the basic blocks into "buckets," or groups, for tracking based on which most-significant bit of a thermometer weight is set. The number of μops may be estimated by the IBBQ for all of the bucketized blocks, starting from the hottest bucket of blocks to the coolest bucket of blocks until the maximum capacity of the μop cache is reached, which will then be allocated into the μop cache. The estimated group of μops may then be allocated, or inserted, into the μop cache in response to a cache build command issued by the μBTB and the IBBQ. At instruction fetch time, the μBTB indicates that a given basic block is to be written into the μBTB after the corresponding instructions are decoded by a decoder. The μop cache and the decoder may do the actual instruction decoding and writing of μops into the μop cache.

The subject matter disclosed herein provides an indication as to which basic blocks should be written to the μop cache. Performance of a CPU may be improved by not entering a μop cache fetch mode until the entire predicted population of the hottest kernel estimated to be allocated into the μop cache has been built and the μBTB determines that the μops that are being fetched are from the population of μop in the μop cache, thereby avoiding CPU redirects caused by μop cache misses based on un-built or evicted μops. In some embodiments, determination of basic blocks that fit into the μop cache may be complicated by the fact that a kernel that is determined to fit into the μop cache during a first pass through the kernel and that is allocated into the μop cache may not fit into the μop cache on a second allocation based on a change in the order in which μops are allocated into the μop cache.

The logic that performs the determination of the group of μops may be referred to as a μop cache build "filter," which may include the μBTB and the IBBQ. The IBBQ may be used to determine the basic blocks that are most likely to be fetched and that individually fit into the μop cache. The μBTB may populate the IBBQ entries and mark basic blocks in the μBTB as being tracked by the IBBQ. The IBBQ may also determine a group of basic blocks that collective fit (as a group) into a cache line of the μop cache. The group of basic blocks may be based on an average number of μops that may occupy a μop cache line. The IBBQ may also track the hotness the groups of basic blocks have been estimated to individually and collectively fit within the entire μop cache along with the basic blocks that have already placed (built) in the μop cache.

The effectiveness of the μop cache may be periodically evaluated and an average number of instructions that may fit in a μop cache line may be adjusted in order to make the μop cache build filter either more conservative or more aggressive based upon a "fitment" feedback received from the μop cache. If it is determined that the average number of instructions that may fit in a μop cache line is too aggressive, a more conservative estimate of how many μop cache entries may be used to build each instruction by decreasing the average number of instructions that may fit in a μop cache line. If the estimate is determined to be too conservative, the average number of instructions that may fit in a μop cache line may be adjusted to be more aggressive by increasing the average number of instructions that may fit in a μop cache line.

The subject matter disclosed herein may also provide power savings by only issuing μop cache build commands for program edges that will actually fit in the μop cache along with all hotter program edges that are already built and are in the μop cache. As used herein, the term "program edge" means a basic block. Performance may be improved by not entering a μop cache fetch mode until it is determined that the entire population of the hottest kernel intended to be inserted into the μop cache has been built which may avoid frontend redirects caused by μop cache misses resulting from un-built or evicted μops.

Figure 1:
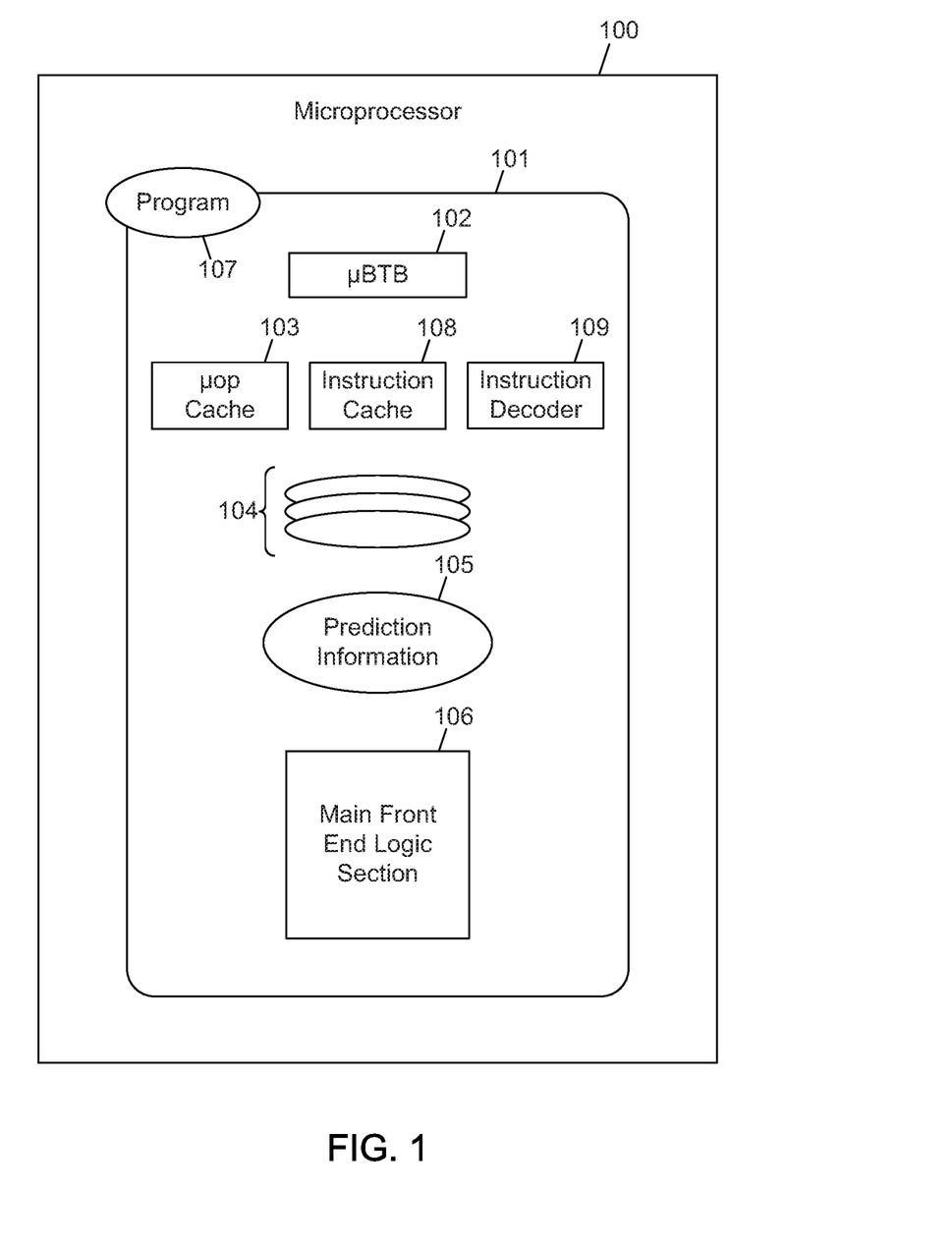
FIG. 1 depicts a block diagram of an example embodiment of a microprocessor that includes a front end having a micro branch target buffer, a μop cache, and an associated decoupling queue according to the subject matter disclosed herein.

FIG. 1 depicts a block diagram of an example embodiment of a microprocessor 100 that includes a front end 101 having a μBTB 102, a μop cache 103, and an associated decoupling queue 104 according to the subject matter disclosed herein. The front end 101 may also include an instruction cache 108, an instruction decoder 109, branch prediction logic (not shown), fetch logic (not shown), or the like, as further described herein. The μBTB 102, the μop cache 103, and the decoupling queue 104 may produce prediction information 105 that may be received by a main front end logic section 106 of the microprocessor 100. It will be understood that the decoupling queue 104 may be considered to be part of the μBTB 102, or alternatively, be considered to be separate from, but associated with the μBTB 102. The decoupling queue 104 may provide the prediction information 105 to the main front end logic section 106 and decouple the μBTB 102 from the rest of the microprocessor 100. The microprocessor 100 may execute a program 107. When the μBTB 102 is confident in the prediction information 105, the μBTB 102 may power gate main prediction structures of the main front end logic section 106, thereby significantly reducing power consumption of the microprocessor 100.

Figure 2:
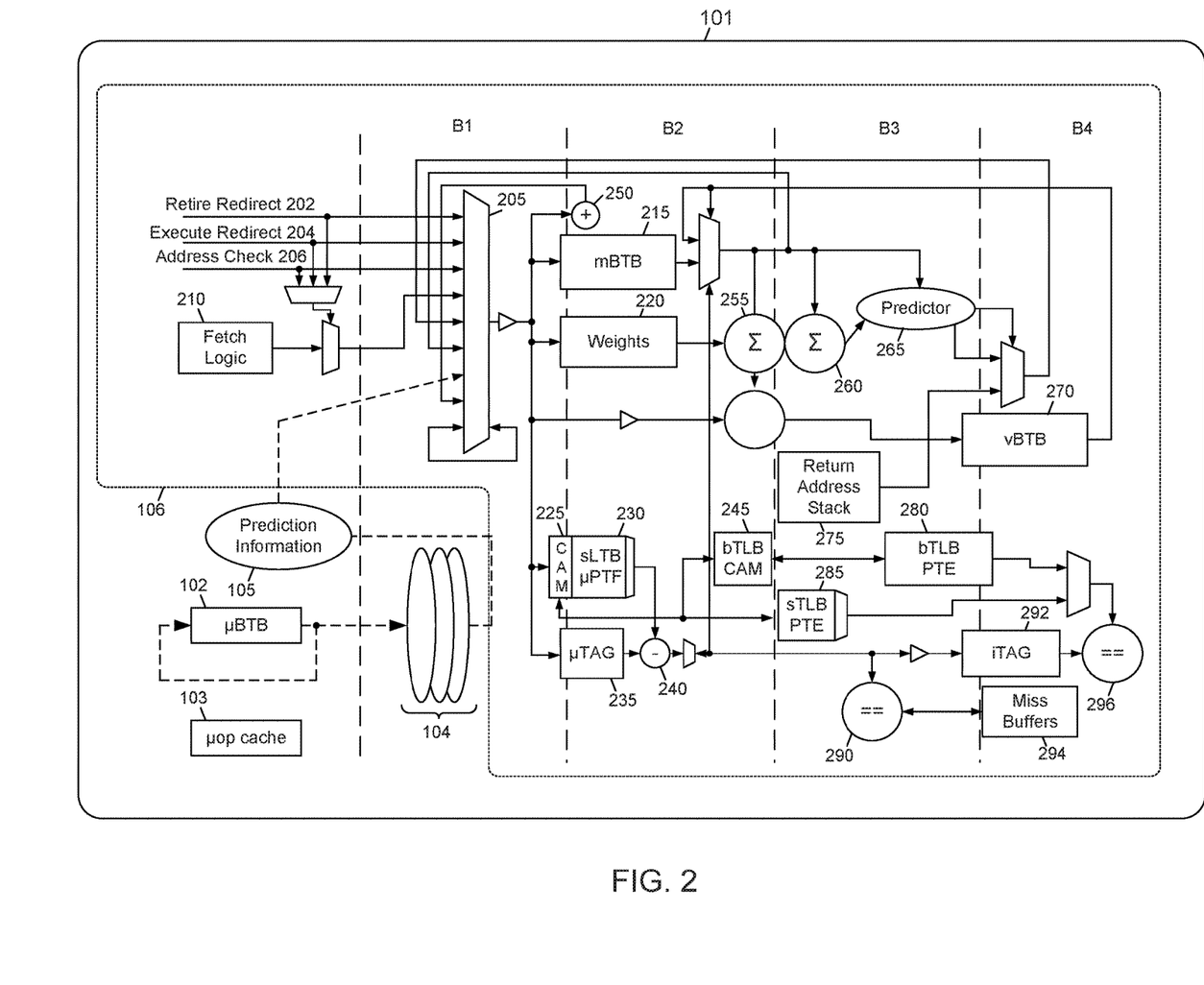
FIG. 2 depicts a block diagram of an example embodiment of the front end of the microprocessor of FIG. 1.
Figure 3:
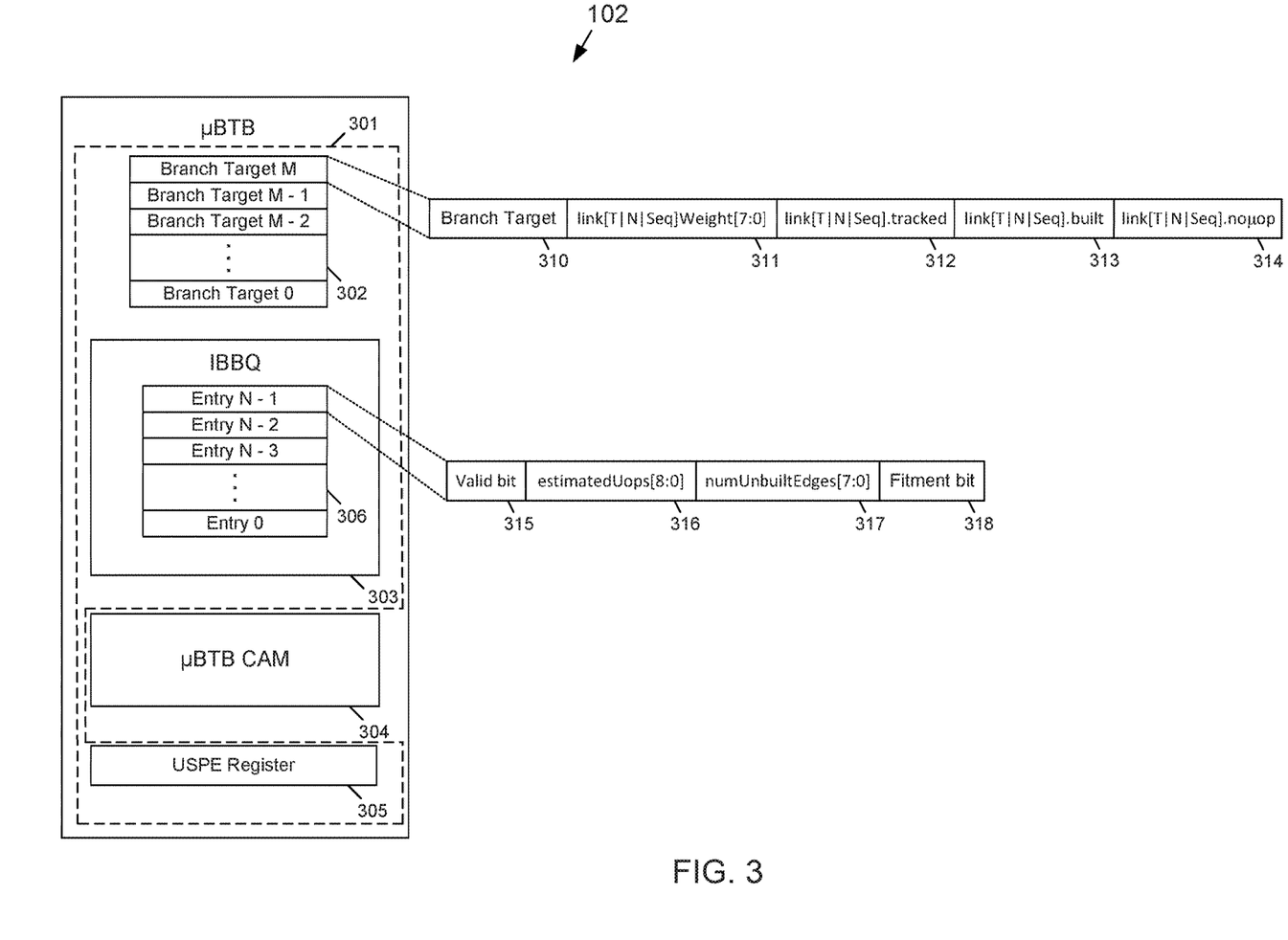
FIG. 3 depicts a block diagram of an example embodiment of the micro branch target buffer of FIGS. 1 and 2 in accordance with the subject matter disclosed herein.

FIG. 2 depicts a block diagram of an example embodiment of the front end 101 of the microprocessor 100 of FIG. 1. FIG. 3 depicts a block diagram of an example embodiment of the μBTB 102 of FIGS. 1 and 2 in accordance with the subject matter disclosed herein.

The front end 101 may include the μBTB 102, the μop cache 103, and the decoupling queue 104, which may provide the prediction information 105 to the main front end logic section 106. The main front end logic section 106 may include various selectors or multiplexors (e.g., 205), adders (e.g., 250, 255, 260), comparators (e.g., 240, 290, and 296), a return address stack 275, and/or other components not shown. Additionally, the main front end logic section 106 may include a main BTB 215 and a virtual BTB 270 that are separate from the μBTB 102.

A BTB may be a structure that contains information about an address, target, class, and/or certain prediction state information of branches in the program 107. The main BTB 215 and the virtual BTB 270 may include information about the branches in the program 107. The μBTB 102 may capture the hot inner portion of the program 107 and allows for a zero bubble taken prediction of branches that would otherwise incur a multiple cycle penalty (a bubble) if predicted by the main BTB 215 or the virtual BTB 270.

The main BTB 215 may hold one or two branches in program-order in a fetch window. A fetch window, for example, may be a 32 byte-aligned block of an instruction address space. The virtual BTB 270 may hold additional pairs of branches that are given in a given fetch window. Fetching may include, for example, retrieving instruction data from a cache hierarchy or memory, predicting any branch instructions that are known to exist at the time, and aligning the instruction data to instruction positions for decode. The virtual BTB 270 may handle a relatively unlikely case in which more than two branches reside in the given fetch window. A main conditional predictor 265 may be coupled to the mBTB 215, which can predict branches based on information, such as weights 220 and information from the main BTB 215 in cases in which the micro BTB 110 is not sufficiently confident in its prediction accuracy.

The main front end logic section 106 may also include one or more content addressable memories (CAMs) (e.g., 225 and 245) and/or one or more translation lookaside buffers (e.g., sTLB 230 and sTLB 285). In some embodiments, the front end logic section 106 may include an iTAG section 292 and/or a μTAG section 235. The main front end logic section 106 may also include a TLB page table entry (e.g., bTLB PTE 280) and/or miss buffers 294. The main front end logic section 106 may be divided into branch prediction pipe stages (e.g., B1, B2, B3, and B4). In the first branch prediction pipe stage (e.g., B1), the multiplexor 205 may receive input from and select from among a fetch logic 210, a retire redirect 202, an execute redirect 204, an address check 206, and/or the prediction information 105 from the μBTB 102, or the like. Although the term "multiplexor" is used herein, it will be understood that "multiplexor" may refer to any suitable kind of selector.

FIG. 3 depicts a block diagram of an example embodiment of a μBTB 102 according to the subject matter disclosed herein. The μBTB 102 may include a μBTB graph (or buffer) 302, an IBBQ 303, a μBTB content addressable memory (CAM) 304, and a useable slots per entry (USPE) register 305. The basic blocks that are built in the μop cache 103 may be a subset of the basic blocks tracked by the μBTB 102. The μBTB graph 302, the IBBQ 303 and the USPE register 305 together may operate as a build filter 301 for the μop cache 103 (FIG. 2). The μBTB graph 302 may be called a graph because it captures or otherwise reflects a "graph" of a program (e.g., program 107) being executed on the microprocessor 100. The μBTB graph 302 may track information about the branches of the program 107 and their basic blocks (i.e., the inner most portion of the kernel of interest) that are determined to be hot. The μBTB CAM 304 may be used for synchronizing the μBTB 102 with a fetch pipeline of the CPU 100 so that the μBTB 102 may provide predictions to the fetch pipeline.

The μBTB graph 302 may store information about μop target branches 310, and may track the "heat" of basic blocks/branches that it tracks using N-bit "thermometer" weight values for each program edge tracked by the μBTB graph 302. Target branches are not necessarily tracked by the μBTB 102. In one embodiment, the μBTB graph 302 may track up to 128 basic blocks. In another embodiment, the μBTB graph 302 may track more than 128 basic blocks. The thermometer weights may be referenced herein as link [T|N|Seq]Weight[7:0] 311. Status bits that may be associated with each program edge tracked by the μBTB 102 may indicate whether a program edge is being tracked by the IBBQ 303 (link[T|N|Seq].tracked) 312, whether the built is in the μop-cache (link[T|N|SEQ].built) 313, or marked "no μop cache build" (link[T|N|Seq].noμop) 314 because a build was attempted.

The IBBQ 303 may be considered to be an extension of the μBTB 102. The IBBQ 303 may be an N-entry register structure 306 that tracks a population, or group, of μBTB program edges have been estimated to individually fit within the entire μop cache 103. In one embodiment, the IBBQ 303 may include eight (8) buckets or entries. The N-1$^{th}$ entry of the IBBQ 303 may be the "hottest" entry, while the 0$^{th}$ entry may be the coolest entry. For example, hotter entries (e.g., entries having relatively larger heat values) move higher in the IBBQ 303, and cooler entries move toward the bottom of the IBBQ 303. Each IBBQ entry tracks a group of program edges instead of an individual edge. A target entry of the IBBQ 303 for a given program edge may be determined by the most significant bit that is set in its heat. For example, if a weight has the value 0xFF, then it maps to IBBQ entry 7 because the bit [7] of the weight is set to 1. If, for example, a weight has a value of 0x52, then the weight maps to IBBQ entry [6]. If a weight has a value of 0x03, then it maps to entry [2] of the IBBQ 303.

Each IBBQ entry may contain a valid bit 315; the estimated number of μops required to represent all program edges tracked by a particular IBBQ entry (estimatedUops[8:0]) 316; a number of μBTB program edges tracked by this IBBQ entry that have not yet been built in the μop cache (numUnbuiltEdges[7:0]) 317; and a fitment bit 318. The fitment bit 318 may be set to equal 1 if all basic blocks tracked by a valid IBBQ entry and hotter valid IBBQ entries are estimated to fit within the μop cache 103.

A plan of record (POR) number of IBBQ entries may be 8, indexed by an 8-bit program edge heat weights that are added to each edge tracked by the μBTB 102. Each link in the μBTB 102 may add a link[T|N|SEQ].tracked bit 312 to determine whether the corresponding program edge is tracked by the IBBQ 303. The heat weights may be represented in the μBTB graph 302 for each link as a link [T|N|SEQ]Weight[7:0] 311 that is added to each graph entry.

The usableSlotsPerEntry [X:0] (USPE) register 305 may be a statistical estimate of the number of μops per μop cache entry effectively being used by the μop cache 103. In one embodiment, each μop cache entry may hold six (6) μops. That is, each μop in a μop cache line is assigned to one of the six slots in the μop entry. Each μop cache entry may hold up to six instructions depending on how many μop instructions the instructions decode into and how efficiently the μop cache 103 is able to place the decoded μops into the μop cache entries (which may also be a function of the order in which μop cache entries are populated). Therefore, the USPE register 305 uses three (3) bits in order to count up to 6. An alternative implementation could, however, indicate values greater than 6 to handle situations in which program edges in the μBTB overlap in the μop cache 103. For the purpose of estimating the population of µops that may fit into the µop cache 103, it is assumed that each instruction decodes into exactly one µop, although some instructions may decode into more than one µop. The USPE register 305 may be used as a heuristic to determine the population of basic blocks that may efficiently fit into the µop cache 103. The USPE register 305 may be used to determine whether the number of instructions known to lie along a program edge corresponding to a µBTB link can theoretically fit within the entire µop cache 103 by themselves by comparing the number of instructions that are known to lie along the program edge corresponding to the µBTB link to the number of entries in the µop cache times the value contained in the USPE register 305. The value of USPE register 305 may be periodically adjusted to be more aggressive or less aggressive depending on how effectively the µops allocated to the µop cache are used. It may not be practical for USPE register 305 to always count to 6 because various µop cache fragmentation effects may cause the average number of usable slots per entry to be less than 6. It may even be possible for the USPE register 305 for a particular program kernel to be greater than 6 due to program edges in the µBTB graph 302 overlapping in the instruction address space.

Figure 4:
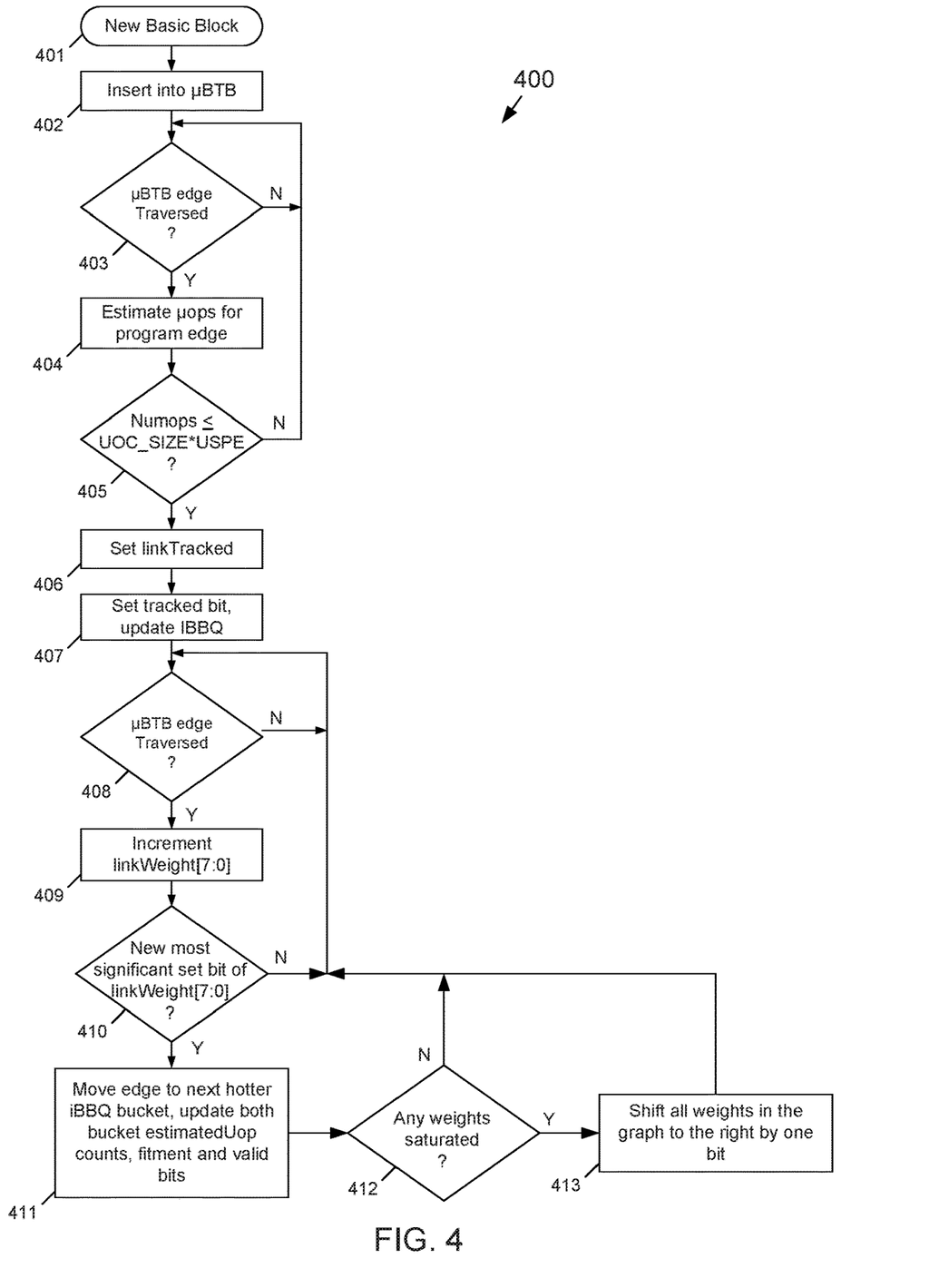
FIG. 4 is a flow diagram of an example embodiment of a basic algorithm of allocation and weighting of an inverted basic block queue according to the subject matter disclosed herein.

FIG. 4 is a flow diagram 400 of an example embodiment of a basic algorithm of allocation and weighting of the IBBQ 303 according to the subject matter disclosed herein. To be inserted into the IBBQ 303, a new basic block at 401 must first pass the build filter 301 and be entered into the µBTB 102 at 402. Passing the build filter 301 at this point involves tracking seed branches inserted into the µBTB CAM 304 and their corresponding edges to determine if they repeat at 403. Anything that the µBTB 102 cannot detect and cannot easily fit will, by definition, not be repeated enough at 403 or small enough for use in a µop cache 103. At 404, the number of µops required to contain the basic block is determined. At 405, it is determined whether the size of the basic block can fit within the entire µop cache 103. If the size is too large, flow returns to 403. If the size of the basic block can fit within the entire µop cache, flow continues to 406 where the graph for the basic block will indicate the basic block in the graph as link[T|N|Seq].tracked 312. At 407, set a tracked bit in the µBTB 102 and update the IBBQ 303.

During the loop that includes 408-410, the µBTB 102 updates the "heat" of individual basic blocks in the µBTB graph 302 as the blocks are traversed, or executed. At 408, it is determined whether a block is traversed. If so, flow continues to 409. If not, flow remains at 408. At 409, a weight value may be incremented by one in response to a traversal, or a hit, of the basic block. Eight-bit "thermometer" weight values may be used.

If, at 410, the weight value for any particular basic block is incremented at 409 and the most significant bit that has been set for that basic block advances by one position (e.g., a weight increments from 127 to 128, then that basic block should be moved to a higher temperature bucket at 411. For example, if the basic block is in the bucket IBBQ[6], the branch information may be removed from bucket IBBQ[6] if the "tracked" bit 312 is set in the graph and the branch information may be added to the bucket IBBQ[7].

Flow continues to 412, where it is determined whether any of the weight values in the µBTB graph 302 have saturated at the maximum value (255). If so, flow continues to 413 where all weight values in the graph, including the saturating value, are shifted right by one position, thereby dividing the shifted weights by 2. That is, the entire contents of the IBBQ 303 are shift down by one position. In another embodiment, all of the weight values in the graph, including the saturating value, may be shifted right by more than one position. Flow returns to 408.

After allocation into the IBBQ 303 at 407, the IBBQ entry may be used to estimate the number of µops of an edge by counting the number of instructions from a branch target that has been taken up to and including the next marked branch (for taken branches), or counting the number of instructions from a branch target that has not been taken starting at the next sequential instruction until the next marked branch. In one embodiment, the IBBQ 303 may not detect µop cache inefficiencies, such as fragmentation and cracked instructions. Fragmentation and cracked instruction conditions may be handled by using the value of the USPE register 305 to update all of the IBBQ fitment bits 318 whenever the IBBQ 303 or the USPE register 305 are updated. This may be done by traversing the IBBQ 303 from the hottest valid bucket [7] to the coolest valid bucket [0] and setting the fitment bit 318 for each bucket if the IBBQ 303 predicts, or estimates, that a bucket and all hotter valid buckets may fit in the µop cache 103 based upon the sum of the estUopCount values for each bucket. This may be done by comparing the sum of the estUopCounts to the number of µop cache entries times the value contained in the USPE register 305. If the sum of the estUopCounts is less than or equal to the number of µop cache entries times the value contained in the USPE register 305, then that bucket and all hotter valid buckets are determined to fit in the µop cache 103. The fitment bits corresponding to that bucket will be set, indicating that a population of program edges or basic blocks has been determined by the IBBQ 303 to fit in the µop cache 103 with a high degree of confidence.

The IBBQ 303 may not issue build requests to the µop cache 103 until the $7^{th}$ or the $6^{th}$ bucket of the IBBQ 303 is "warm" enough to make a confident prediction. This may happen when either the hottest IBBQ bucket ([7]) or the second hottest IBBQ bucket ([6]) is warm enough to account for IBBQ shifting when an individual µBTB graph edge weight saturates is valid. The µBTB 102 should also be fetching a program edge that is marked as being tracked in the IBBQ 303, the corresponding IBBQ bucket must be valid, and the IBBQ bucket fitment bit 318 must equal 1.

Subroutine returns may be a special case because the estimated number of µops from the target of a given return may change if the return is called from multiple places in the program. The µBTB 102 may use a µBTB commit return address stack (RAS) to determine an estimated number of µops from the next sequential instruction of the call up to, but not including, the program counter (PC) of the next branch on the sequential path.

The IBBQ 303 may continue to track the relative heats of basic blocks whether the blocks are already allocated in the µop cache 103 or not. This is possible if the kernel still exists in the µBTB 102 as well. The µBTB 102 may still hit on the µop cache 103 on fetches, but the relative heat of basic blocks may be lost. The IBBQ 303 may use basic block relative heat in conjunction with the estimated number of µops per block to select whether to thrash existing allocations with new builds. For example, a relatively hot basic block having a large number of µop counts should not always be considered to be more buildable than a warm basic block having relatively few µop counts. If the IBBQ 303 determines that a basic block is both hot enough and able to fit with the µop estimation, the IBBQ 303 with send a build message to the decoder.

The IBBQ 303 is also used to determine when all of the edges that belong to a given IBBQ entry have been built. The numUnbuiltEdges[7:0] counter field 317 indicates how many µBTB edges are being tracked by the µBTB 102 that have not yet been allocated into µop cache 103. The numUnbuiltEdges[7:0] counter field 317 for an IBBQ entry may be incremented by one when an unbuilt edge is allocated or moved to an IBBQ entry (from a cooler entry to a new hotter entry). When the µBTB 102 determines that all of the µops corresponding to an edge have been built in the µop cache 103, the µBTB 102 marks the edge as BUILT, or allocated, in the µBTB 102 and decrements the numUnbuiltEdges[7:0] counter field 317. When numUnbuiltEdges[7:0] 317 equals 0 for a given IBBQ entry, it is known that all of the edges that correspond to that IBBQ entry have been built. Using this information, it can be detected when all edges at the same IBBQ heat or hotter than the currently predicted µBTB 102 branch have been built, indicating that entering into a µop cache fetch mode at that time is likely to be productive. That is, it is unlikely to immediately attempt fetch from an unbuilt edge. This condition may be made extremely conservative by requiring all IBBQ entries with fitment=1 to also have numUnbuiltEdges[7:0] 317 equal to 0. A slightly more conservative approach may require all IBBQ entries from the next coolest entry to the hottest entry to have numUnbuiltEdges 317 equal to 0 before a µop cache fetch mode could be entered for a given edge. Timing concerns may be handled by adding an allBuilt bit to the IBBQ entries that indicates when a numUnbuiltEdges[7:0] counter 317 for a given entry has counted down to 0.

When the IBBQ 303 has determined that a kernel is small enough to fit in the µop cache 103, as well as hot enough to be repeatable, the IBBQ 303 may start issuing build messages to the decoder to capture some of the µops as the µops flow through the pipeline for normal execution. In general, the build flow may be as follows: A frontend 101 may issue a build message with a start and end instruction pointer. The build message may append to an existing µop cache line, or use a free list to point to a new line to begin allocation. The decoder may begin capturing µops. When a µop cache line fills, the decoder may send a response build line valid (or fail) message to front end 101 indicating instruction (not µop) endpoints in the line and whether a µop of an instruction tail spills over to another line.

The frontend 101 may update the µop cache 103 by tagging the updated instruction allocations in the translated µop cache line tags. Should a new freelist entry be needed, a new pointer will be provided to the decoder. The frontend 101 may provide a re-response to the decoder build line message identifying any sequential pointer chain updates if necessary. The decoder may continue to capture µops and the frontend 101 may continue to provide re-responses until the decoder has allocated all requested instructions or an end/cancel/flush/fail condition occurs.

The number of usable µop cache slots per entry, usableSlotsPerEntry, or USPE value in the USPE register 305, may be used to predict whether a given program edge or basic block can individually fit into the entire µop cache 103. The value of USPE register 305 may be adjusted downward to account for fragmentation effects that may cause inefficient usage of the µop cache entries. Additionally, the value of the USPE register 305 may be adjusted upward to account for improved efficiency of entry usage that can be due to changes in fetch patterns that result in improved efficiency as well as program edges in the µBTB graph 302 overlapping in instruction space, i.e., edges tracked by the µBTB 102 overlap in the instruction and µop caches. This may be done by using a filterBranchCommitCounter[11:0] register to detect when, for example, 4095 branches have committed since the last time USPE value was re-evaluated. When filterBranchCommitCounter[11:0] register overflows the following steps may be taken: filterBranchCommitCounter register is reset, and if all entries of the µop cache 103 are valid (not all slots in each entry, but all entries), i.e., the µop cache 103 is full. If the number of fetches from the µop cache 103 that completely hit from the µop cache 103 is less than, for example, 10 times the number of µop cache entries that were evicted from the µop cache 103 before being used by a fetch, then the USPE value is decremented by 1 if it has not already reached 0. This makes the USPE register 305 value more conservative if there are too many µop cache entries evicted before the µops may be used to supply all of the µops for a given fetch.

If not all entries of the µop cache 103 are valid, i.e., there are one or more that are free and could be used to hold a larger program kernel, and if the number of fetches from the µop cache 103 that completely hit from the µop cache 103 are greater than or equal to, for example, 10 times the number of µop cache entries that were evicted from the µop cache 103 before the µops were used by a fetch, then the USPE value may be incremented by one, if it has not already saturated. This makes the value in the USPE register 305 more aggressive by expanding the size of the program graph that may be covered by the µop cache 103. The USPE register 305 may be sized so that it may count to a value larger than the number of µop positions in a µop cache entry to account for program edges overlapping in the µop cache 103.

To keep the IBBQ and the µBTB consistent, the IBBQ entries may be reset, uBTB graph link[N|T|SEQ]Tracked 312 cleared and all µBTB graph link[T|N|SEQ]Weight 311 (the weights) may be zeroed whenever any of the following events occur: (1) an instruction cache line is invalidated; (2) a µBTB graph entry is moved from one entry to another; (3) a new branch has been added to µBTB graph 302; (4) a µBTB graph entry is connected to another µBTB graph entry forming a new basic block (or program edge), except if the write is for a µBTB graph SEQ link for a call that is written by a return that did not mis-predict its target; and a µBTB graph entry is invalidated.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method to allocate micro-operations (µops) into a µop cache, the method comprising:
   tracking, by a micro branch target buffer (µBTB), basic blocks of instructions being executed by a processing device, each basic block corresponding to a respective edge of the instructions being executed by the processing device;
   allocating, by the µBTB, a first basic block to an inverted basic block queue (IBBQ) based on the first basic block fitting into the µop cache; and
   allocating, by the IBBQ, the first basic block to the µop cache based on a number of times the edge corresponding to the first basic block is repeatedly executed by the processing device.

2. The method of claim 1, further comprising incrementing a counter in the µBTB containing a count of the number of times that the edge corresponding to the first basic block is executed by the processing device.

3. The method of claim 2, further comprising:

allocating, by the µBTB, a second basic block to the IBBQ based on the second basic block fitting into the µop cache; and allocating, by the IBBQ, the second basic block to the pop cache based on a number of times the edge corresponding to the second basic block is repeatedly executed by the processing device, and wherein the IBBQ comprises an N-entry buffer to track a number of times each basic block allocated to the IBBQ is repeated.

4. The method of claim 3, further comprising setting a predetermined average number of µops that fit in the µop cache, and wherein allocating the first basic block to the µop cache is further based on a first number of µops of the first basic block and a total number of µops of basic blocks allocated to the µop cache being equal to or less than the predetermined average number of µops that fit in the µop cache.

5. The method of claim 4, further comprising adjusting the predetermined average number of µops that fit in the µop cache based on a number of µops evicted from the µop cache.

6. The method of claim 4, wherein allocating the first basic block to the µop cache is further based on the first number of µops of the first basic block and the total number of µops of basic blocks allocated to the µop cache collectively fitting in the µop cache.

7. The method of claim 6, further comprising tracking by the IBBQ a count corresponding to each basic block allocated to the IBBQ, each respective count corresponding to a number of times the edge corresponding to the basic block allocated to the IBBQ is executed by the processing device.

8. The method of claim 7, further comprising organizing two or more allocations of basic blocks tracked by the IBBQ based on a highest to lowest count.

9. The method of claim 8, further comprising:
determining that the count for the second basic block allocated to the IBBQ has saturated; and
dividing the count corresponding to each respective basic block allocated to the IBBQ by a predetermined amount in response to determining that the count for the second basic block allocated to the IBBQ has saturated.

10. The method of claim 9, further comprising determining that a count of one of the basic blocks allocated to the IBBQ equals 0 after dividing the count corresponding to each respective basic block allocated to the IBBQ by the predetermined amount; and
selectively removing the basic block corresponding to the count that equals 0 from the IBBQ.

11. A processing device, comprising:
a micro-operation (µop) cache;
a micro branch target buffer (µBTB) configured to track basic blocks of instructions being executed by the processing device, each basic block corresponding to a respective edge of the instructions being executed by the processing device; and
an inverted basic block queue (IBBQ) coupled to the µBTB, the IBBQ configured to receive a first basic block based on the first basic block fitting into the µop cache, and the IBBQ allocating the first basic block to the µop cache based on a number of times the edge corresponding to the first basic block is repeatedly executed by the processing device.

12. The processing device of claim 11, wherein the µBTB comprises a counter containing a count of the number of times that the edge corresponding to the first basic block is executed by the processing device.

13. The processing device of claim 12, wherein the µBTB is further configured to allocate a second basic block to the IBBQ based on the second basic block fitting into the µop cache, wherein the IBBQ is further configured to allocate the second basic block to the µop cache based on a number of times the edge corresponding to the second basic block is repeatedly executed by the processing device, and wherein the IBBQ comprises an N-entry buffer to track a number of times each basic block allocated to the IBBQ is repeated.

14. The processing device of claim 13, wherein the µBTB further comprises a first register that contains a predetermined average number of µops that fit in the µop cache, and wherein the IBBQ allocates the first basic block to the µop cache further based on a first number of µops of the first basic block and a total number of µops of basic blocks allocated to the µop cache being equal to or less than the predetermined average number of µops that fit in the µop cache.

15. The processing device of claim 14, wherein the predetermined average number of µops that fit in the µop cache is adjusted based on a number of µops evicted from the µop cache.

16. The processing device of claim 14, wherein the IBBQ allocates the first basic block to the µop cache further based on the first number of µops of the first basic block and the total number of µops of basic blocks allocated to the µop cache collectively fitting in the µop cache.

17. The processing device of claim 16, wherein the IBBQ tracks a count corresponding to each basic block allocated to the IBBQ, each respective count corresponding to a number of times the edge corresponding to the basic block allocated to the IBBQ is executed by the processing device.

18. The processing device of claim 17, wherein two or more allocations of basic blocks tracked by the IBBQ are organized based on a highest to lowest count.

19. The processing device of claim 18, wherein the IBBQ is further configured to determine that the count for the second basic block allocated to the IBBQ has saturated; and to divide the count corresponding to each respective basic block allocated to the IBBQ by a predetermined amount in response to determining that the count for the second basic block allocated to the IBBQ has saturated.

20. The processing device of claim 19, wherein the IBBQ is further configured to determine that a count of one of the basic blocks allocated to the IBBQ equals 0 after dividing the count corresponding to each respective basic block allocated to the IBBQ by the predetermined amount; and to selectively remove the basic block corresponding to the count that equals 0 from the IBBQ.

* * * * *